United States Patent Office 3,829,451
Patented Aug. 13, 1974

3,829,451
PROCESS FOR PRODUCING TRIMELLITIC ANHYDRIDE
Jean Berthoux, Decines, and Claude Gerbelot-Barrillon, Lyon, France, assignors to Progil, Paris, France
No Drawing. Continuation of abandoned application Ser. No. 781,267, Dec. 4, 1968. This application Dec. 23, 1971, Ser. No. 211,676
Claims priority, application France, Dec. 29, 1967, 134,511
Int. Cl. C07c 63/32
U.S. Cl. 260—346.4
8 Claims

ABSTRACT OF THE DISCLOSURE

A method for producing pure trimellitic anhydride from the reaction mixture obtained by liquid-phase oxidation of pseudo-cumene by air or oxygen in the presence of a catalyst, an aliphatic carboxylic acid solvent and, if desired, a dehydration agent such as benzene by subjecting the reaction mixture to a distillation under an absolute pressure of 200–800 mm. Hg and then rectifying the non-distilled portion under vacuum to yield pure trimellitic anhydride.

---

This is a continuation of application Ser. No. 781,267 filed Dec. 4, 1968, and now abandoned.

The present invention relates to a process of manufacturing trimellitic anhydride from 1,2,4-trimethyl benzene (or pseudo-cumene), and more particularly to a process of isolating pure trimellitic anhydride from the reaction mass obtained by the liquid-phase oxidation of pseudo-cumene by air or oxygen.

In U.S. Pat. 3,402,184, applicants have described a process of manufacturing aromatic polycarboxylic acids and anhydrides by oxidizing aromatic hydrocarbons containing one or several oxidizable side-chains with air under specific conditions. When using a raw material capable of producing a mixture of acid and anhydride, then the reaction mass is hydrolyzed with water, and finally, after filtration of the mixture with the filtrate being recycled to the oxidation step, the acid so formed and recovered is dehydrated to the corresponding anhydride, which is purified by rectification under reduced pressure.

During further research in this field, applicants have noted that the total yields of trimellitic anhydride made according to the above method, have proved less reproducible, and in a general way, much less favorable than during phthalic anhydride preparation. It has been noted, for example, during a series of tests that while the yield of phthalic anhydride was constantly at a figure of about 90% or more, the total yield of trimellitic anhydride obtained with respect to the amount of pseudo-cumene used was lowered, in some cases, to a value near 60%. A detailed study of the reactions has shown that in the case of trimellitic anhydride production, a set of phenomena takes place, which does not appear in phthalic anhydride production, and which may be summarized as follows: after hydrolysis, a non-negligible part of the trimellitic acid remains dissolved in the mother-liquors; moreover, they contain some oxidation intermediary products which, when the mother-liquors are recycled to the reaction, are not further oxidized and further appear to form complexes with the catalyst inhibiting its activity. Due to these phenomena, a loss in trimellitic acid occurs during recycling, an enrichment of the reaction medium in intermediate oxidation products and a reduction of the oxidation rate also occur all leading to a significant decrease in the total yield of the desired anhydride.

The deficiencies noted in trimellitic anhydride preparation occur not during the oxidation itself, but from the treatment of the raw reaction mass coming from the oxidation. Accordingly, applicants have sought a method of obtaining a pure trimellitic anhydride with a better total yield utilizing these oxidation techniques.

Processes are, of course, known for treating the pseudo-cumene oxidation reaction masses and more especially of dehydrating trimellitic acid in order to obtain the corresponding anhydride in a pure state. For example, a method has been described of partially dehydrating trimellitic acid by heating in the presence of a stream of inert gases or vapors, the acid having previously been isolated from the reaction medium by some physical means such as filtration, evaporation or the like, then of extracting the formed anhydride from the dehydration medium by the use of a convenient solvent, and finally separating the anhydride by cooling and/or partial evaporation of the solvent, eventually, after passage of the solution through an adsorbing coal to remove the colored impurities (U.S. Pat. 2,971,011).

Another known technique consists in isolating a portion of the raw trimellitic acid from the oxidation mass by crystallization and filtration, in treating the filtration liquor separately to remove the acetic acid present and to dehydrate the dissolved trimellitic acid. The anhydride obtained from this liquor is extracted by means of a solvent, isolated by evaporation of the solvent or any other method, and joined with the raw trimellitic acid first recovered. This is then dehydrated and the anhydride formed is purified by fractionation (U.S. Pat. 3,161,658).

It is seen that these prior art techniques are very complex.

Accordingly, it is an object of the present invention to provide a simple method for treating a pseudo-cumene oxidation reaction mass to obtain a good yield of trimellitic anhydride.

The process according to the present invention in general consists in submitting all of the reaction mass resulting from the oxidation step to a first distillation under an absolute pressure of between 200–800 mm. Hg, in order to remove the aliphatic carboxylic acid used as a solvent during oxidation and to end dehydration of the trimellitic acid present into the anhydride, the distilled fraction being recycled to the oxidation, then by rectifying the remaining mixture under a high vacuum to recover the pure trimellitic anhydride.

The process of the present invention is advantageously applied to the reaction mixture obtained in oxidizing pseudo-cumene according to the method described in applicants' Pat. 3,402,184. This method consist in reacting an alkyl-aromatic hydrocarbon with air in the presence of heavy metal salts such as halides and of a carboxylic acid as a solvent, at a temperature of between 110 and 230° C., under a pressure of 3–15 kg./cm.² maintained constant during the oxidation. The process is generally carried out in a series of reactors in which the liquid circulates, partially or wholly, countercurrently to the air, the operation being conducted without vapor condensation between reactors and without addition of fresh solvent in the last reactor. The gaseous flux in excess coming from oxidation, loaded with steam, aliphatic carboxylic acid and unreacted alkyl-aromatic hydrocarbon passes into an azeotropic distillation column where it is dehydrated in the presence of benzene, for example. The aliphatic carboxylic acid and the alkyl-aromatic hydrocarbon are recovered and recycled to the reaction.

In the case of pseudo-cumene oxidation the most favorable operation conditions are generally the following:

It is advantageous to choose a temperature of between 160 and 200° C., preferably of 170 to 190° C. The optimal pressure ranges from 8 to 10 kg./cm.². The respective ratios of pseudo-cumene and aliphatic acid used as a solvent, generally acetic acid, are preferably between 10–

20% by weight of hydrocarbon to 90–80% of acetic acid, without taking the weight of catalyst into account. It is known that the catalyst is a mixture of heavy metal salts and/or halides, and may be a mixture of cobalt acetate, manganese chloride and barium bromide or cobalt acetate, manganese acetate and barium bromide. The molar proportion of each one of the constituents, which may be the same or different, is chosen in such a way that the entire quantity of catalyst used corresponds preferably to a value of 0.006–0.036 mole per mole of hydrocarbon to be oxidized.

According to a variation, it is possible to achieve the dehydration of the medium by introducing directly into the mixture submitted to oxidation, some quantity of a compound favoring water removal by azeotropic means. Of course this compound must be neutral with respect to oxidation and preferably is benzene. The quantity used must be at least sufficient to remove the water formed during the entire reaction. Preferably an excess is used as any benzene present after the oxidation stage has been found to favor trimellitic acid dehydration during the process of treating the reaction mass according to the invention. In general, a proportion of benzene of about 5–15% is used with respect to the total weight of the liquid phase submitted to oxidation, not taking the catalyst into account.

The pseudo-cumene oxidation mass obtained by operating under the conditions described above contains a quantity of trimellitic acid and anhydride which corresponds to a yield exceeding 90% of theoretical according to chromatography sample analyses. This is then treated according to the invention for the separation of pure trimellitic anhydride.

As indicated above, the entire reaction mass is submitted first to a distillation, either under atmospheric pressure, or under a lower pressure which can go down to 200 mg. Hg, for example. This operation continues until the temperature in the boiler reaches 250–300° C., preferably 260–280° C. It is advantageous to conduct the distillation under an inert gas atmosphere, such as nitrogen. In operating under such conditions, a practically quantitative dehydration of trimellitic acid into the corresponding anhydride is obtained. In the same way the carboxylic acid present in the mass, usually acetic acid, is wholly removed. If the variation of introducing a dehydrating agent, such as benzene, directly into the mixture has been used, the quantity of this compound present is also separated during this step. On the whole the distilled fraction consists essentially of the solvent from the oxidation, some quantity of water and the dehydrating agent, if used, generally benzene. This fraction can be recycled directly to the oxidation, that is without having any intermediary treatment. The small amount of water present is in no way prejudicial to the oxidation reaction since, as it has been seen, this reaction is achieved under conditions permitting water removal.

After the distillation, there remains as bottoms, a mixture comprising in its greatest part trimellitic anhydride with the oxidation catalyst and small quantities of various oxidation products such as phthalic or methylphthalic acids and some heavy products. This mixture is then subjected according to the invention to a rectification under high vacuum. It is generally conducted under a pressure lower than 20 mg. Hg, preferably between 1–10 mm. It is advantageous to conduct rectification under an inert gas atmosphere, such as for example nitrogen. The temperature at the head of the rectification column is in the range of 180–200° C. according to the pressure. The temperature at the foot of the column at first is from 200–220° C. and increases progressively up to about 280° C. A head fraction representing 2–4% of the initial mixture is recovered. It is made up of intermediary oxidation products such as phthalic and methylphthalic acids as well as trimellitic anhydride. The middle fraction is made up of pure trimellitic anhydride, and a residue remains which contains essentially catalyst, some heavy products and a very low proportion of trimellitic anhydride. This residue may be treated for catalyst and trimellitic anhydride recovery.

The process according to the invention does not require any special equipment and may be conducted in rectification and distillation devices of known types. The process may be effected, as with the pseudo-cumene oxidation, in a continuous or discontinuous manner.

The process according to the invention permits the production of pure trimellitic anhydride in a yield of from 85–90% with respect to the acid and anhydride present in the raw reaction mixture of 1,2,4-trimethylbenzene oxidation. The product purity is satisfactory; its crystallization point is greater than 165.5° C.

Though it is very advantageous to apply this process to an oxidation mixture of pseudo-cumene obtained according to the techniques described in the patent referred to above, it is quite obvious that the present process may be utilized for the treatment of any mixture obtained by liquid phase oxidation of pseudo-cumene by air or oxygen in the presence of a metal catalyst.

The following example, given in a non-limitative way, illustrates the present process numerically, in a discontinuous operation. The indicated parts are parts by weight.

Example

Into a rector provided with a stirrer, an air inlet, an azeotropic distillation column fitted with a condenser and a decanter, there was fed 1,440 parts of pseudo-cumene (purity 98.5%), 6,840 parts of acetic acid, 720 parts of benzene and 28.10 parts of a catalytic system constituted of equal molar ratios of hydrated barium bromide, hydrated manganese acetate, and hydrated cobalt acetate. This mixture was submitted to oxidation by introducing air into the reactor at a rate of about 2,700 l./h. at a temperature of about 180° C. and under a constant pressure of 9.5 kg./cm.$^2$ in absolute value. Oxygen absorption lasted about seven hours. The water formed during the reaction was drawn off from the decanter as it was formed.

A sampling by chromatography has shown that the quantity of trimellitic anhydride and acid present in the mixture represented 91.5% by weight of the oxidation products.

The entire oxidation raw mass, that is 9,080 parts, was passed into the foot of a distillation column operating at atmospheric pressure under a nitrogen atmosphere. The operation resulted in increasing the temperature progressively at the foot of the column up to 260° C. There were recovered 6,880 parts of a distillate made up of acetic acid, benzene and water. This fraction was recycled directly to the oxidation.

The bottoms resulting from the distillation constituting about 2,200 parts, was directed into the foot of a rectification column operating under a pressure of 2.5 mm. Hg and under a nitrogen atmosphere. The operation resulted in progressively increasing temperature at the foot of the column from 210 to 290° C. At the head of the column was recovered a fraction of 66 parts of a mixture containing essentially phthalic and methylphthalic acids and a small quantity of trimellitic anhydride.

The middle fraction was composed of about 1925 parts of trimellitic anhydride. This product had a crystallization point of 166° C.

What is claimed is:

1. In a process for producing pure trimellitic anhydride from the reaction mass obtained by liquid-phase oxidation of 1,2,4-trimethyl benzene (pseudo-cumene) by air or oxygen in the presence of a carboxylic acid solvent, catalyzed by heavy metal salts, the improvement consisting of submitting the whole of the reaction mass coming from oxidation to a first distillation under an absolute pressure of between 200 and 800 mm. Hg until the solvent and any residual water is removed and all the trimellitic acid is dehydrated to trimellitic anhydride and then rectifying the non-distilled fraction under a high vacuum so as to distill off pure trimellitic anhydride.

2. A process according to claim 1 wherein the distillation is conducted under atmospheric pressure.

3. A process according to claim 1 wherein the distillation is conducted in the presence of a dehydrating agent.

4. A process according to claim 1 wherein the distillation is conducted in the presence of benzene.

5. A process according to claim 1 wherein the distilled fraction during the first operation is recycled to the oxidation.

6. A process according to claim 1 wherein the bottom products coming from the first distillation are rectified under a pressure lower than 20 mm. Hg.

7. A process according to claim 1 wherein the two operative steps of the process are achieved under an inert gas atmosphere.

8. A process for producing pure trimellitic anhydride from the reaction mass obtained by liquid phase oxidation of 1,2,4-trimethyl benzene by air or oxygen in the presence of an aliphatic carboxylic acid solvent and catalysts comprising barium bromide jointly with cobalt and manganese salts at 100–230° C. under 3.15 kg./cm.$^2$, comprising:

distilling the whole of the reaction mass coming from said oxidation under 200–800 mm. Hg in the presence of benzene to produce a head fraction and a foot fraction until a temperature of about 250–300° C. is reached at the foot;

rectifying by distillation under vacuum said foot fraction up to a temperature at the head of from 180–200° C. and at the foot up to 280° C., to produce a head fraction, a middle fraction and a foot fraction; and collecting said middle fraction.

References Cited
UNITED STATES PATENTS

| | | | |
|---|---|---|---|
| 2,971,011 | 2/1961 | Liao et al. | 260—346.3 |
| 3,261,846 | 7/1966 | Meyer | 260—346.3 X |

NATALIE TROUSOF, Primary Examiner

B. DENTZ, Assistant Examiner

U.S. Cl. X.R.

260—346.3